L. R. BLACKMORE.
VISE.
APPLICATION FILED JUNE 5, 1909.

968,444.

Patented Aug. 23, 1910.

WITNESSES
H. E. Barry
Perry B. Turpin

INVENTOR
LAWRENCE R. BLACKMORE
BY Munn & Co.
ATTORNEYS

UNITED STATES PATENT OFFICE.

LAWRENCE R. BLACKMORE, OF ARLINGTON, NEW JERSEY.

VISE.

968,444.  Specification of Letters Patent.  Patented Aug. 23, 1910.

Application filed June 5, 1909. Serial No. 500,327.

*To all whom it may concern:*

Be it known that I, LAWRENCE R. BLACKMORE, a citizen of the United States, and a resident of Arlington, in the county of Hudson and State of New Jersey, have made certain new and useful Improvements in Vises, of which the following is a specification.

This invention is an improvement in vises, and particularly in pipe vises; and the invention consists in certain novel constructions and combinations of parts as will be hereinafter described and claimed.

Figure 1:
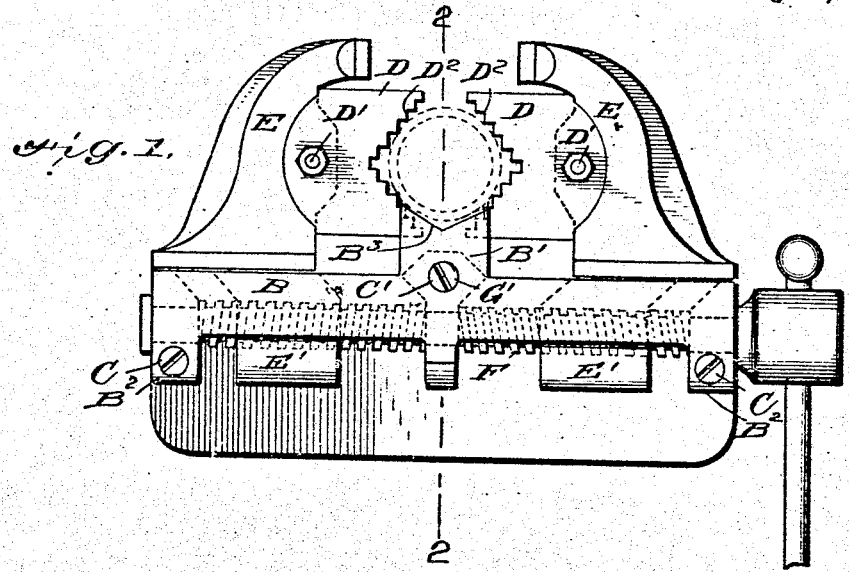
Figure 2:
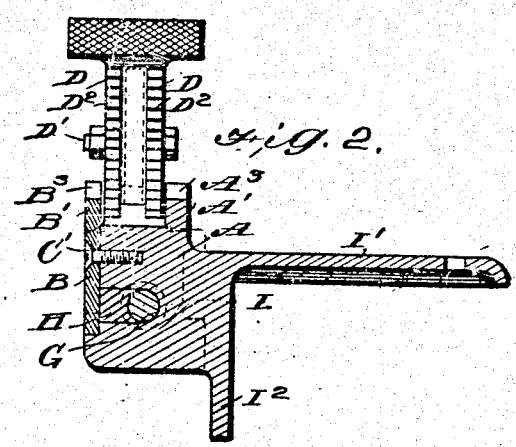

In the drawing Figure 1 is a side view of my wrench, and Fig. 2 is a cross section on about line 2—2 Fig. 1.

In the use of pipe vises it is common in the ordinary form of pipe vise to slide the pipes longitudinally from one position to another along one of the serrated or toothed jaws of the vise. This operates to dull the teeth of said jaws and is objectionable for such reason.

By my invention I seek, among other improvements, to provide means whereby the pipe is supported independently of the toothed jaw in adjusting the pipe to the desired position, and in doing this I provide a saddle below the opposite toothed jaws and in such relation to the latter that the teeth of the toothed jaws as the latter are brought together, will operate to lift the pipe from the saddle to permit the clamping of the pipe by the toothed jaws of the vise and at the same time when the jaws are moved apart the pipe will be readjusted by gravity onto the saddle. I also provide for moving the two toothed jaws toward and from the pipe instead of simply moving one of the jaws, as this moving of the two jaws is correlated with the saddle as in operation the movement of the two jaws with their tapered toothed faces toward each other and upon the pipe operates to lift the pipe from the saddle as the jaws are moved to a position to clamp the pipe.

In the construction shown the vise has a body A, and a removable side plate B, and a saddle is formed in two sections A' and B', one section being integral with the body A and the other section integral with the side plate B, which latter is secured to the body A by the bolts C and C', the bolts C passing through the depending arms B² at the ends of the plate B, and the bolt C' passing through the said plate B at the lower end of the upwardly projecting lug forming the section B' of the saddle. The saddle sections B' and A' are provided in their upper ends with the recesses B³ and A³ forming seats for the pipe when the latter rests upon the saddle.

The pipe jaws D are carried by the jaws E, which may be similar to the jaws of an ordinary vise, the pipe jaws D being pinned at D' to the jaws E. The pipe jaws D have their toothed faces D² tapered inwardly as best shown in Fig. 1, and these tapered jaws extend below the upper edge of the saddle so that the pipe if rested on the saddle may be lifted therefrom by the movement of the pipe jaws D toward each other and into engagement with the pipe as will be understood from Fig. 1 of the drawing. The jaws have the depending portions E' which are threaded for engagement by the operating screw F, which preferably has a right hand thread operating in one of the nut portions E', and a left hand thread operating in the other nut portion E" so that as the screw F is turned in one direction or the other it will operate to move the jaws toward or from each other. The screw is fitted in lateral bearings G in the body of the vise, and is held therein by the blocks H, which are secured by the side plate B when the latter is held in position by the bolts C, C', as before described.

The vise is provided with a bracket I, for connection with a bench, the said bracket having a top plate I', and a depending plate I², arranged at one side of the vise body so the bracket may be applied to a bench in such manner as to support the vise entirely in front of the bench as is desirable for use by pipe fitters, the vise being especially designed for use as a pipe fitter's vise.

It will be noticed that the top plate I' extends from the body A in a plane parallel to the axis of the screw F.

I claim—

1. The improved vise herein described comprising a body portion provided with an upwardly projecting saddle section and having below said saddle section bearings, a jaw operating screw in said bearings and having right and left threads, blocks for holding the screw in its bearings, a side plate fitting over said blocks and retaining the same, said side plate being provided with a saddle section complementary to that of the body, and both said saddle sections being provided in their upper ends with depressed recesses forming seats for a pipe, means securing the side plate to the vise body, and pipe jaws operating between the saddle sections and having tapered toothed portions extending below the seats of the saddle sections.

2. A wrench having spaced apart saddle sections provided at their upper ends with seats for a pipe, pipe jaws operating between the saddle sections and having tapered toothed portions extending below the seats of the saddle sections, and a screw operating said jaws and having right and left threads, substantially as set forth.

3. A pipe vise comprising a saddle having sections spaced apart and provided at their upper edges with seats for a pipe, pipe jaws operating between said seats, and in such relation to the saddle sections that the teeth of the toothed jaws as the latter are brought together, will operate to lift the pipe from the saddle and means for moving said jaws toward and from each other.

4. A vise having a saddle adapted to support a pipe when released by the jaws, and pipe jaws having tapered toothed portions extending below the upper edge of said saddle whereby said jaws are adapted to lift a pipe from the saddle when the jaws are moved into clamping relation with the pipe, substantially as set forth.

5. A pipe vise having a body portion, and a side plate held thereto, both said plates being provided with upwardly projecting saddle sections, and pipe jaws movable between said saddle sections and having tapered portions extending below the upper edge of the saddle section whereby the jaws are adapted to lift a pipe therefrom in moving the jaws into clamping relation with the pipe, substantially as set forth.

6. The combination in a vise of a body portion having upwardly projecting saddle sections and provided with bearings for a jaw operating screw, a screw journaled in said bearings, jaws operated by the screw, blocks retaining the screw in its bearings, a side plate securing the blocks in place, and having an upwardly projecting saddle section coöperating with that on the body portion, and jaws operated by the screw and adapted to lift a pipe from the saddle sections, substantially as set forth.

7. A pipe vise having a saddle composed of sections spaced apart, and pipe jaws movable toward and from each other between said saddle sections and having toothed portions extending below the upper edge of the saddle sections.

LAWRENCE R. BLACKMORE.

Witnesses:
GEORGE C. BLACKMORE,
WM. M. NOBLE.